(12) United States Patent
Teh

(10) Patent No.: US 10,897,202 B2
(45) Date of Patent: Jan. 19, 2021

(54) POWER SOURCE CIRCUIT WITH OUTPUT VOLTAGE CONTROL AND SUPPRESSION OF POWER CONSUMPTION

(71) Applicants: Kabushiki Kaisha Toshiba, Tokyo (JP); Toshiba Electronic Devices & Storage Corporation, Tokyo (JP)

(72) Inventor: Chen Kong Teh, Ota Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/543,796

(22) Filed: Aug. 19, 2019

(65) Prior Publication Data
US 2020/0244169 A1 Jul. 30, 2020

(30) Foreign Application Priority Data
Jan. 25, 2019 (JP) .................. 2019-011098

(51) Int. Cl.
*H02M 3/158* (2006.01)
(52) U.S. Cl.
CPC ................ *H02M 3/1582* (2013.01)
(58) Field of Classification Search
CPC .... H02M 3/155; H02M 3/158; H02M 3/1563; H02M 3/157; H02M 3/1582; H02M 3/1588; H02M 2033/1555; H02M 2033/1566
See application file for complete search history.

(56) References Cited

U.S. PATENT DOCUMENTS

| | | | | | |
|---|---|---|---|---|---|
| 5,079,498 | A | * | 1/1992 | Cleasby | H02M 3/157 323/283 |
| 5,594,324 | A | * | 1/1997 | Canter | H02M 3/157 323/282 |
| 6,441,690 | B1 | * | 8/2002 | Savelli | H03C 3/0941 331/1 A |
| 6,606,044 | B2 | * | 8/2003 | Roeckner | H03F 3/2175 330/251 |
| 7,109,688 | B1 | * | 9/2006 | Chiu | H02M 1/36 323/222 |
| 7,598,715 | B1 | * | 10/2009 | Hariman | H02M 3/1588 323/222 |

(Continued)

FOREIGN PATENT DOCUMENTS

JP 2013-135511 A 7/2013
JP 5566859 B2 8/2014

(Continued)

*Primary Examiner* — Thienvu V Tran
*Assistant Examiner* — Nusrat Quddus
(74) *Attorney, Agent, or Firm* — White & Case LLP

(57) ABSTRACT

According to an embodiment, a power source circuit includes a switching element that is connected between an input terminal and an output terminal, a driving circuit that supplies a PWM driving signal to the switching element, a first control path that integrates a differential voltage between an output voltage and a reference voltage to output a first control signal, a second control path that converts the differential voltage into a digital signal to output a second control signal, and a PWM signal generation circuit that generates a PWM signal dependent on the first and second control signals.

18 Claims, 6 Drawing Sheets

(56) References Cited

U.S. PATENT DOCUMENTS

| | | | | |
|---|---|---|---|---|
| 8,085,024 B2* | 12/2011 | Prodic | ............... | H02M 3/157 |
| | | | | 323/283 |
| 8,482,271 B2* | 7/2013 | Prodic | ............. | H02M 3/1588 |
| | | | | 323/285 |
| 8,854,024 B2 | 10/2014 | Teh | | |
| 10,630,184 B1* | 4/2020 | Blakely | ................ | G05F 1/40 |
| 2006/0227861 A1* | 10/2006 | Maksimovic | ......... | H03K 7/08 |
| | | | | 375/238 |
| 2007/0114986 A1* | 5/2007 | Yoshii | ............. | H02M 3/1588 |
| | | | | 323/288 |
| 2008/0106917 A1* | 5/2008 | Holt | .................. | H02M 3/157 |
| | | | | 363/26 |
| 2009/0033299 A1* | 2/2009 | Ishino | ............. | H02M 3/1588 |
| | | | | 323/282 |
| 2009/0201000 A1* | 8/2009 | Kojima | ........... | H02M 3/1588 |
| | | | | 323/282 |
| 2012/0056605 A1* | 3/2012 | Ooba | ................. | H02M 3/157 |
| | | | | 323/271 |
| 2012/0119719 A1* | 5/2012 | Teh | .................. | H02M 3/1588 |
| | | | | 323/282 |
| 2014/0117955 A1* | 5/2014 | Zoso | ................. | H02M 3/157 |
| | | | | 323/271 |
| 2014/0266123 A1* | 9/2014 | Rader | ............... | H02M 3/156 |
| | | | | 323/288 |
| 2017/0353108 A1* | 12/2017 | Joos | .................. | H02M 3/158 |

FOREIGN PATENT DOCUMENTS

| | | |
|---|---|---|
| JP | 2015-27235 A | 2/2015 |
| JP | 2018-42383 A | 3/2018 |

* cited by examiner

POWER SOURCE CIRCUIT WITH OUTPUT VOLTAGE CONTROL AND SUPPRESSION OF POWER CONSUMPTION

CROSS-REFERENCE TO RELATED APPLICATIONS

This application is based upon and claims the benefit of priority from Japanese Patent Application No. 2019-011098, filed on Jan. 25, 2019; the entire contents of which are incorporated herein by reference.

FIELD

The present embodiment generally relates to a power source circuit.

BACKGROUND

A digitally controlled DC/DC converter has conventionally been known as a power source circuit that converts a direct current input voltage into a predetermined direct current output voltage and output it. In a case of digital control, while there is an advantage of being insulated from an influence of noise, a Least Significant Bit (LSB) width of an A/D converter that converts a differential voltage between an output voltage and a reference voltage into a digital signal has to be decreased to improve a resolution, in order to improve accuracy of an output voltage, where power consumption is increased. Furthermore, in a case of so-called voltage mode control, a differentiation circuit for avoiding oscillation involved with a phase shift that is caused by an inductor and a smoothing capacitor of a DC/DC converter may be provided, where power consumption is increased. Furthermore, in a so-called current mode control, an increase in power consumption that is caused by a circuit that detects an inductor current is involved. A power source circuit is desired that is capable of controlling an output voltage accurately and is capable of suppressing power consumption.

DETAILED DESCRIPTION

According to one embodiment, a power source circuit includes a switching element with a main current path that is connected between an input terminal where an input voltage is applied thereto and an output terminal that supplies an output voltage thereto where turning on/off thereof is controlled by a PWM driving signal, a driving circuit that supplies the PWM driving signal to the switching element, a first control path that includes an integration circuit that outputs an integration signal provided by integrating a differential voltage between the output voltage and a reference voltage, and outputs a first control signal that controls a pulse width of a PWM signal, a second control path that includes an A/D converter that converts the differential voltage between the output voltage and the reference voltage into a digital signal, and outputs a second control signal that controls a pulse width of the PWM signal, and a PWM signal generation circuit that generates, and supplies to the driving circuit, a PWM signal with a pulse width that is adjusted depending on the first control signal and the second control signal.

Hereinafter, a power source circuit according to embodiments will be explained in detail with reference to the accompanying drawings. Additionally, the present invention is not limited by such embodiments.

First Embodiment

Figure 1:
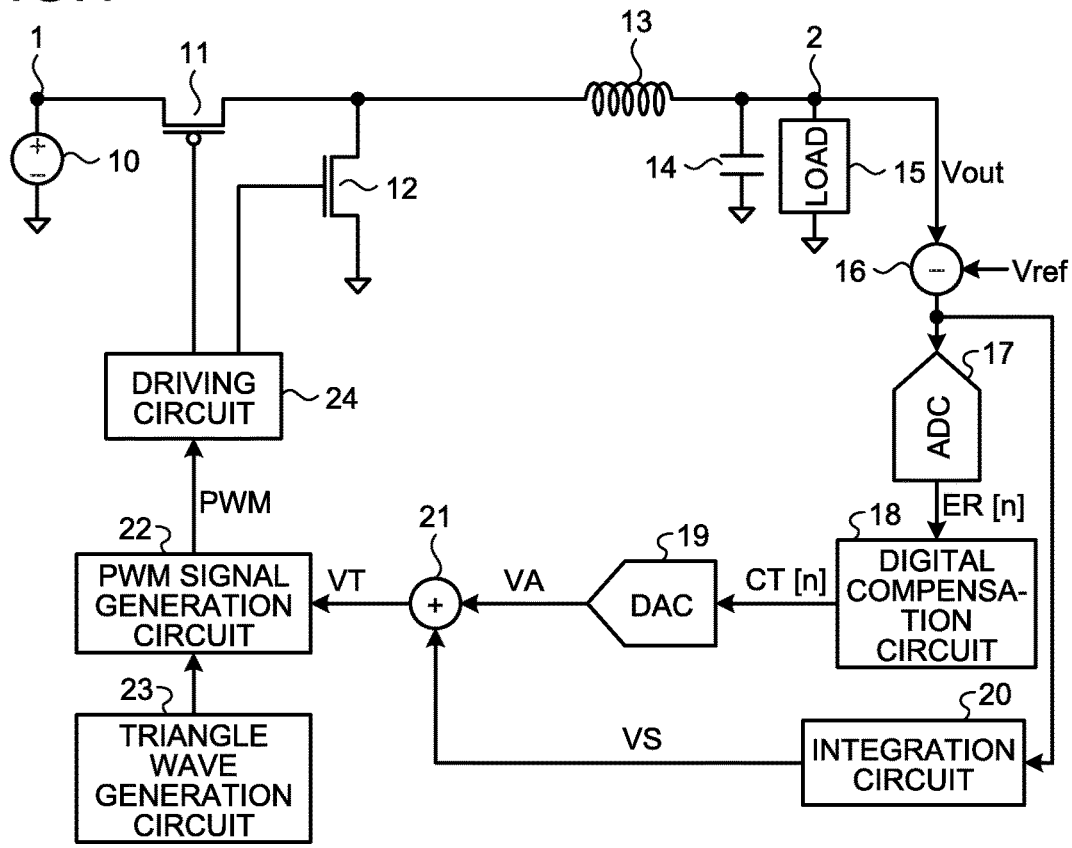
FIG. 1 is a diagram illustrating a power source circuit according to a first embodiment.

FIG. 1 is a diagram illustrating a power source circuit according to a first embodiment. The present embodiment has a PMOS transistor 11 with a source electrode that is connected to an input terminal 1 where a direct current voltage source 10 is connected thereto and a drain electrode that is connected to an output terminal 2 via an inductor 13. That is, a source-drain path that is a main current path of the PMOS transistor 11 is connected between the input terminal 1 and the output terminal 2. A drain electrode of an NMOS transistor 12 is connected to the drain electrode of the PMOS transistor 11. A source electrode of the NMOS transistor 12 is grounded. The PMOS transistor 11 and the NMOS transistor 12 compose switching elements that are turned on/off in response to driving signals that are supplied from a driving circuit 24.

The other terminal of the inductor 13 is connected to one terminal of a smoothing capacitor 14. The other terminal of the smoothing capacitor 14 is grounded. A connection terminal of the inductor 13 and the smoothing capacitor 14 is connected to the output terminal 2 that outputs an output voltage Vout and the output voltage Vout is supplied to a load 15.

An output voltage Vout is supplied to a subtraction circuit 16. The subtraction circuit 16 outputs a differential voltage between an output voltage Vout and a reference voltage Vref. The subtraction circuit 16 is composed of, for example, a differential amplification circuit. An output of the subtraction circuit 16 is supplied to an A/D converter 17. For the A/D converter 17, it is possible to use a variety of A/D converters such as a successive-approximation type A/D converter or a flash type A/D converter.

The A/D converter 17 outputs an error value ER[n] of a digital signal depending on an output signal of the subtraction circuit 16. An error value ER[n] is supplied to a digital compensation circuit 18.

The digital compensation circuit 18 receives an error value ER[n] that is output by the A/D converter 17 and calculates by a PID operation and outputs a control value CT[n] for executing Proportional Integral Derivative (PID) control in such a manner that an output voltage Vout is equal to a reference voltage Vref.

A control value CT[n] that is output by the digital compensation circuit 18 is represented by, for example, the following formula (1).

$$CT[n]=CT[n-1]+a\times ER[n]+b\times ER[n-1]+c\times ER[n-2]+d\times ER[n-3] \quad (1)$$

Herein, ER is an error value and a, b, c, and d represent compensation coefficients. Furthermore, [n], [n−1], [n−2], and [n−3] indicate that they are a present value, a value in one switching cycle ago, a value in two switching cycles ago, and a value in three switching cycles ago, respectively.

A control value CT[n] of the digital compensation circuit 18 is supplied to a D/A converter 19. The D/A converter 19 analog-convers a control value CT[n] into an analog conversion signal VA and supplies it to an addition circuit 21.

An output signal of the subtraction circuit 16 is supplied to an integration circuit 20. The integration circuit 20 integrates a differential voltage between an output voltage Vout and a reference voltage Vref to generate an integration signal VS and supplies it to the addition circuit 21.

A voltage that is output by the integration circuit 20 is changed depending on a differential voltage between an output voltage Vout and a reference voltage Vref. A decrease thereof is caused at a time when an output voltage Vout is less than a reference voltage Vref whereas elevation thereof is caused at a time when an output voltage Vout is higher than a reference voltage Vref. That is, an integration signal VS of the integration circuit 20 is changed on the basis of a voltage dependent on a reference voltage Vref and stabilized at a time when an output voltage Vout is equal to a reference voltage Vref.

A control signal VT of the addition circuit 21 is supplied to a PWM signal generation circuit 22. The PWM signal generation circuit 22 generates a PWM signal PWM from a triangle wave that is output by a triangle wave generation circuit 23 and a control signal VT that is output by the addition circuit 21, and supplies it to a driving circuit 24.

The driving circuit 24 supplies driving signals to gate electrodes of the PMOS transistor 11 and the NMOS transistor 12 in response to a PWM signal PWM that is output by the PWM signal generation circuit 22. Turning on/off of the PMOS transistor 11 and the NMOS transistor 12 is controlled complementarily. When the PMOS transistor 11 is tuned on, a state where an output voltage Vout is elevated is provided. That is, control to elevate an output voltage Vout is executed during a period of time when the PMOS transistor 11 is turned on. Additionally, in order to avoid a state where the PMOS transistor 11 and the NMOS transistor 12 are simultaneously turned on, the driving circuit 24 supplies driving signals to the PMOS transistor 11 and the NMOS transistor 12 while a predetermined dead time is provided.

According to the first embodiment, it has a path of digital control to execute a PID operation depending on a differential voltage between an output voltage Vout and a reference voltage Vref and execute control in such a manner that an output voltage Vout is equal to a reference voltage Vref, and a path of analog control to generate a control voltage provided by integrating a differential voltage between an output voltage Vout and a reference voltage Vref. An integration signal VS that is supplied via the integration circuit 20 is changed depending on a differential voltage between an output voltage Vout and a reference voltage Vref and stabilized at a time when an output voltage Vout is equal to a reference voltage Vref. Therefore, an integration signal VS of the integration circuit 20 is a first control signal that is changed in such a manner that an output voltage Vout is equal to a reference voltage Vref.

Furthermore, a control path that includes the A/D converter 17, the digital compensation circuit 18, and the D/A converter 19 outputs an analog conversion signal VA that is changed in such a manner that an output voltage Vout is equal to a reference voltage Vref.

Control of a duty cycle of a PWM signal in an analog control path that includes the integration circuit 20 is executed by an integration signal VS from the integration circuit 20 that is stabilized at a time when an output voltage Vout is equal to a reference voltage Vref, so that it is possible to control an output voltage Vout accurately even when a resolution of the A/D converter 17 is reduced to compose a control path of digital control. Thereby, it is possible to reduce a resolution of the A/D converter 17 to provide a configuration, so that it is possible to suppress power consumption of a power source circuit.

Furthermore, a control path of digital control that includes the A/D converter 17, the digital compensation circuit 18, and the D/A converter 19 executes rapid control that is executed by a control value CT[n] that is generated based on an error value ER[n] dependent on a differential voltage between an output voltage Vout and a reference voltage Vref. Therefore, comparatively gradual analog control that includes the integration circuit 20 and a high-speed control path of digital control that includes the A/D converter 17 coexist, so that a power source control is provided that is capable of suppressing power consumption thereof and accurately executing control in such a manner that an output voltage Vout is equal to a reference voltage Vref.

Figure 2:
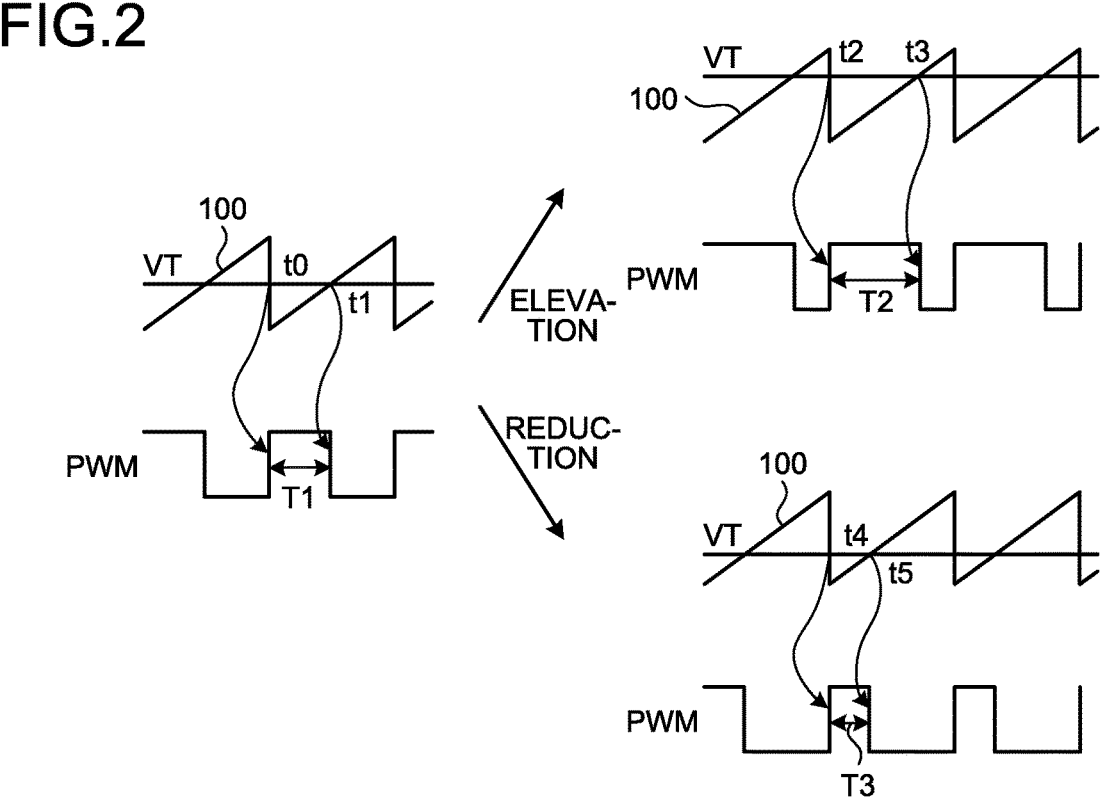
FIG. 2 is a diagram for explaining an operation of a power source circuit according to a first embodiment.

FIG. 2 is a diagram for explaining an operation of a power source circuit according to the first embodiment. A relationship among a triangle wave 100 that is output by the triangle wave generation circuit 23, a control signal VT that is output by the addition circuit 21, and a PWM signal PWM that is output by the PWM signal generation circuit 22 is illustrated. As already described, a control signal VT is a signal provided by adding an analog conversion signal VA from a digital control path that includes the A/D converter 17, the digital compensation circuit 18, and the D/A converter 19 and an integration signal VS from an analog control path that includes the integration circuit 20.

For example, the PWM signal generation circuit 22 outputs a PWM signal PWM that is at a High level at a time when a control signal VT is higher than a voltage of a triangle wave that is supplied from the triangle wave generation circuit 23.

In a state as illustrated on a left side, a PWM signal PWM is at a High level at timing t0 when a voltage of a triangle wave 100 is lower than a control signal VT and is Low at timing t1 when a voltage of a triangle wave 100 is higher than a control signal VT, that is, a PWM signal PWM with a duration of T1 at a High level is generated.

A state as illustrated in an upper section on a right side indicates a case where a control signal VT is elevated. A case is illustrated where an output voltage Vout is higher than a reference voltage Vref and a control signal VT from the addition circuit 21 is elevated. In such a case, a PWM signal PWM is generated in such a manner that the PWM signal PWM is at a High level at timing t2 when a voltage of a triangle wave 100 is lower than a control signal VT and is Low at timing t3 when a voltage of a triangle wave 100 is higher than a control signal VT. A control signal VT is elevated, so that a period of time T2 when a PWM signal PWM is at a High level is increased.

A state as illustrated in a lower section on a right side indicates a case where a control signal VT is reduced. A case is illustrated where an output voltage Vout is lower than a reference voltage Vref and a control signal VT from the addition circuit 21 is reduced. In such a case, a PWM signal PWM is generated in such a manner that the PWM signal PWM is at a High level at timing t4 when a voltage of a triangle wave 100 is lower than a control signal VT and is Low at timing t5 when a voltage of a triangle wave 100 is higher than a control signal VT. A control signal VT is reduced, so that a period of time T3 when a PWM signal PWM is at a High level is decreased.

As described above, a duration of a PWM signal PWM at a High level that is output by the PWM signal generation circuit 22, that is, a duty cycle, is adjusted depending on a control signal VT from the addition circuit 21. In the first embodiment as already described, an output voltage Vout is elevated at a time when the PMOS transistor 11 is in an on-state. Therefore, for example, a PWM signal PWM that is output by the PWM signal generation circuit 22 is inverted by the driving circuit 24 and supplied to gates of the PMOS transistor 11 and the NMOS transistor 12, so that it is possible to provide a configuration to turn on the PMOS transistor 11 in a period of time that corresponds to a period of time when a PWM signal PWM is at a High level. That is, it is possible to provide a configuration to control a period of time when the PMOS transistor 11 is turned on, depending on a period of time when a PWM signal PWM is at a High level. Thereby, it is possible to provide a configuration that executes control to increase a period of time of a PWM signal PWM at a High level to elevate an output voltage Vout as a control signal VT from the addition circuit 21 is elevated or decrease a period of time at a High level to reduce an output voltage Vout as a control signal VT is reduced.

Second Embodiment

Figure 3:
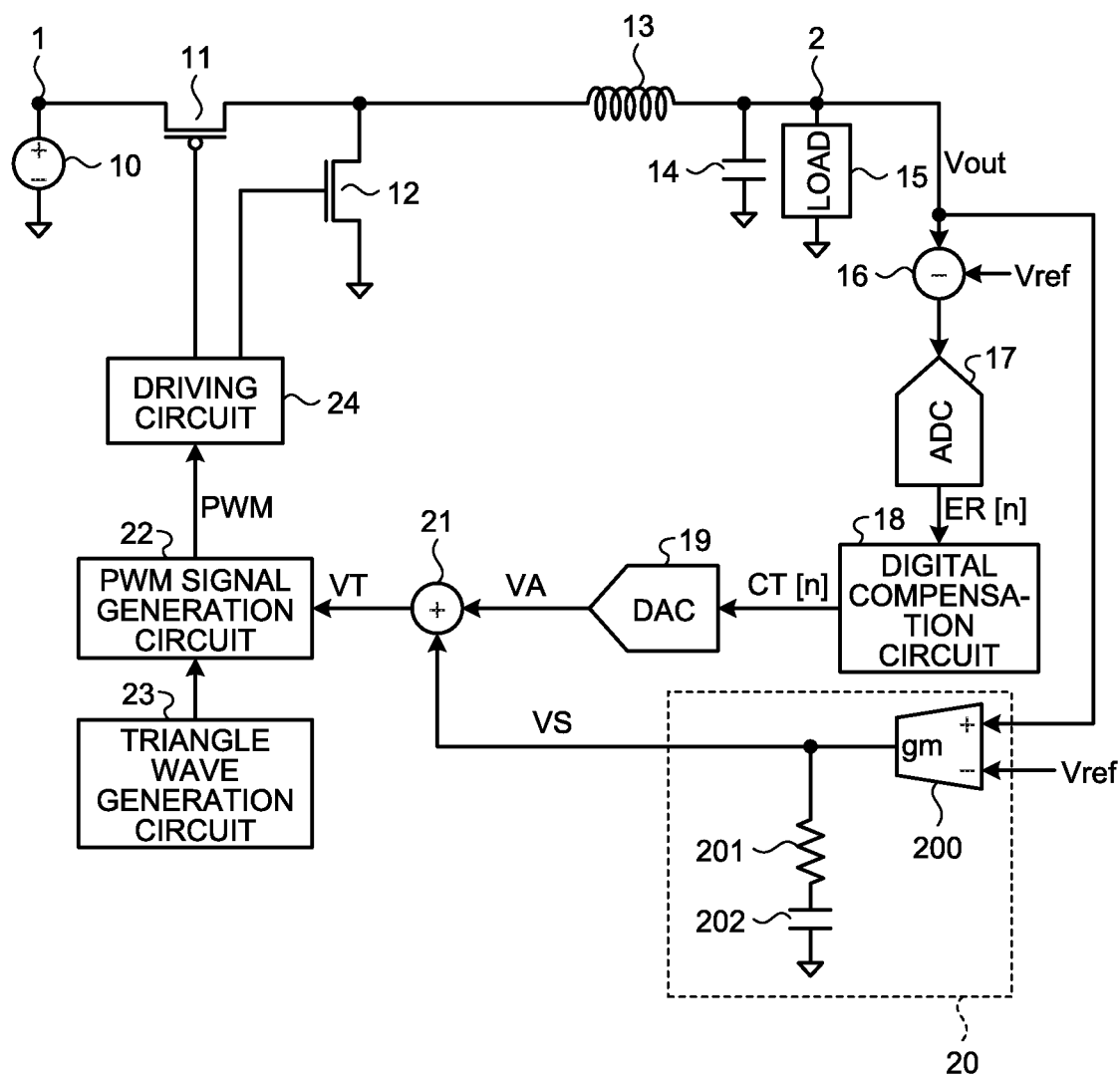
FIG. 3 is a diagram illustrating a power source circuit according to a second embodiment.

FIG. 3 is a diagram illustrating a power source circuit according to a second embodiment. A component that corresponds to that of the embodiment as already described will be provided with an identical sign and a redundant description will be provided only in case of need. Hereinafter, the same applies. An integration circuit 20 in the present embodiment has an Operational Transconductance Amplifier (OTA) 200 that is a voltage/current converter that outputs a current dependent on a differential voltage between an output voltage Vout and a reference voltage Vref and a resistor 201 and a capacitor 202 that are connected in series between an output terminal of the OTA 200 and a grounding terminal.

An output voltage Vout is applied to a non-inverting input terminal (+) of the OTA 200 and a reference voltage Vref is applied to an inverting input terminal (−) thereof. The OTA 200 amplifies, depending on a gain gm, a differential voltage between an output voltage Vout and a reference voltage Vref, and outputs an output current. The capacitor 202 is charged with such an output current. By such a configuration, an integration signal VS dependent on a differential voltage between an output voltage Vout and a reference voltage Vref is output. A current that is output by the OTA 200 is changed depending on a differential voltage between an output voltage Vout and a reference voltage Vref. That is, it increases at a time when an output voltage Vout is higher than a reference voltage Vref, whereas it decreases at a time when an output voltage Vout is lower than a reference voltage Vref. Thereby, a voltage of the capacitor 202 that is charged with an output current of the OTA 200 is changed on the basis of a voltage dependent on a reference voltage Vref and stabilized at a time when an output voltage Vout is equal to a reference voltage Vref. Additionally, the resistor 201 may be omitted.

In the present embodiment, the integration circuit 20 is composed of the OTA 200 and a series circuit of the resistor 201 and the capacitor 202 that are connected to an output terminal of the OTA 200. The OTA 200 is used as the integration circuit 20 that integrates and outputs a change of an output voltage Vout with respect to a reference voltage Vref, so that a high response speed is not required. Therefore, it is possible to provide a configuration to suppress a bias current of the OTA 200, so that it is possible to suppress power consumption that is caused by the OTA 200.

Third Embodiment

Figure 4:
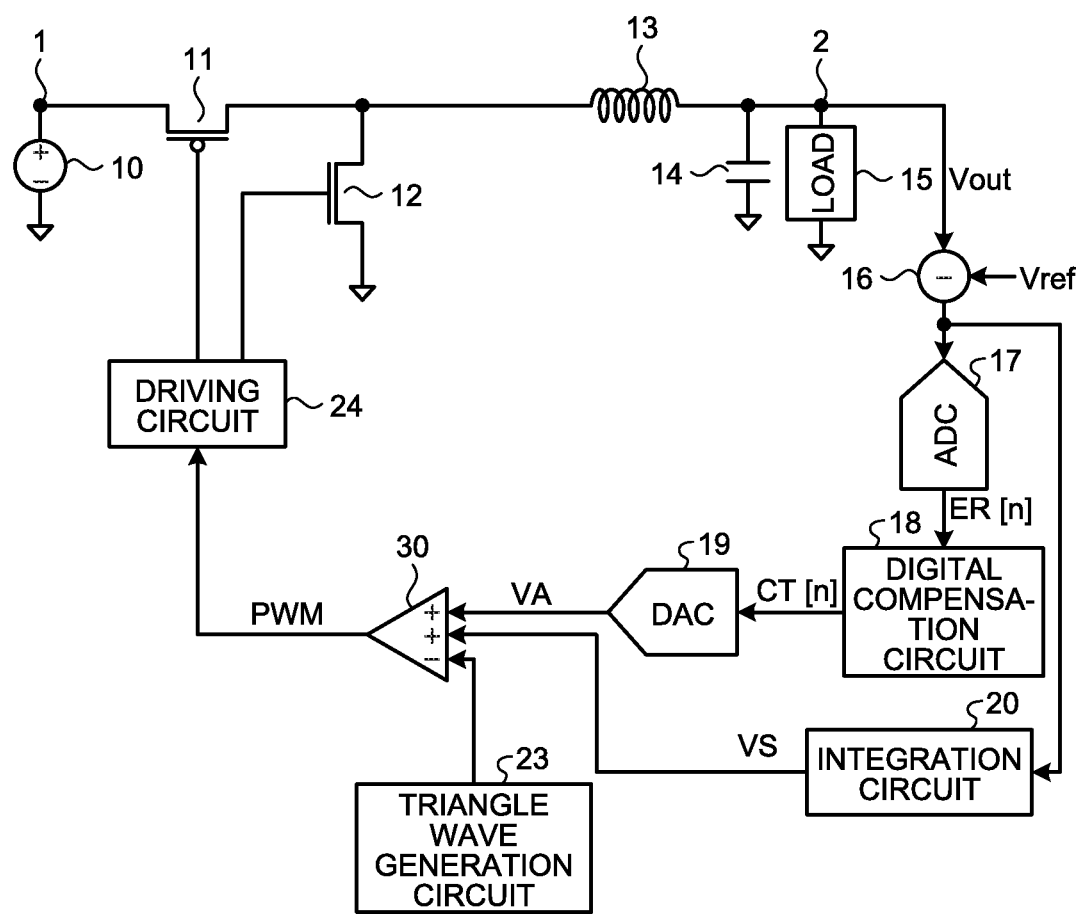
FIG. 4 is a diagram illustrating a power source circuit according to a third embodiment.

FIG. 4 is a diagram illustrating a power source circuit according to a third embodiment. The present embodiment has a comparison circuit 30 where each of an analog conversion signal VA of a D/A converter 19 and an integration signal VA of an integration circuit 20 is supplied to a non-inverting input terminal (+) thereof and an output signal of a triangle wave generation circuit 23 is supplied to an inverting input terminal (−) thereof. An analog conversion signal VA from the D/A converter 19 and an integration signal VS from the integration circuit 20 that are applied to the non-inverting input terminal (+) of the comparison circuit 30 are added and compared with a triangle wave that is output from the triangle wave generation circuit 23. A PWM signal PWM that is at a High level at a time when a value of a signal provided by adding an analog conversion signal VA and an integration signal VS is greater than a triangle wave is output.

That is, a duty cycle of a PWM signal PWM is adjusted depending on a value of a signal provided by adding an analog conversion signal VA and an integration signal VS, so that turning on/off of a PMOS transistor 11 and an NMOS transistor 12 is controlled and control is executed in such a manner that an output voltage Vout is equal to a reference voltage Vref.

In the present embodiment, an analog conversion signal VA of a digital control path that includes an A/D converter 17 and a control signal VS from the integration circuit 20 are added and compared with a triangle wave from the triangle wave generation circuit 23 in the comparison circuit 30, so that a PWM signal PWM dependent on a result of such comparison is output. That is, addition of an analog conversion signal VA and an integration signal VS that are two control signals and generation of a PWM signal PWM are executed in the comparison circuit 30, so that it is possible to simplify a circuit configuration.

Fourth Embodiment

Figure 5:
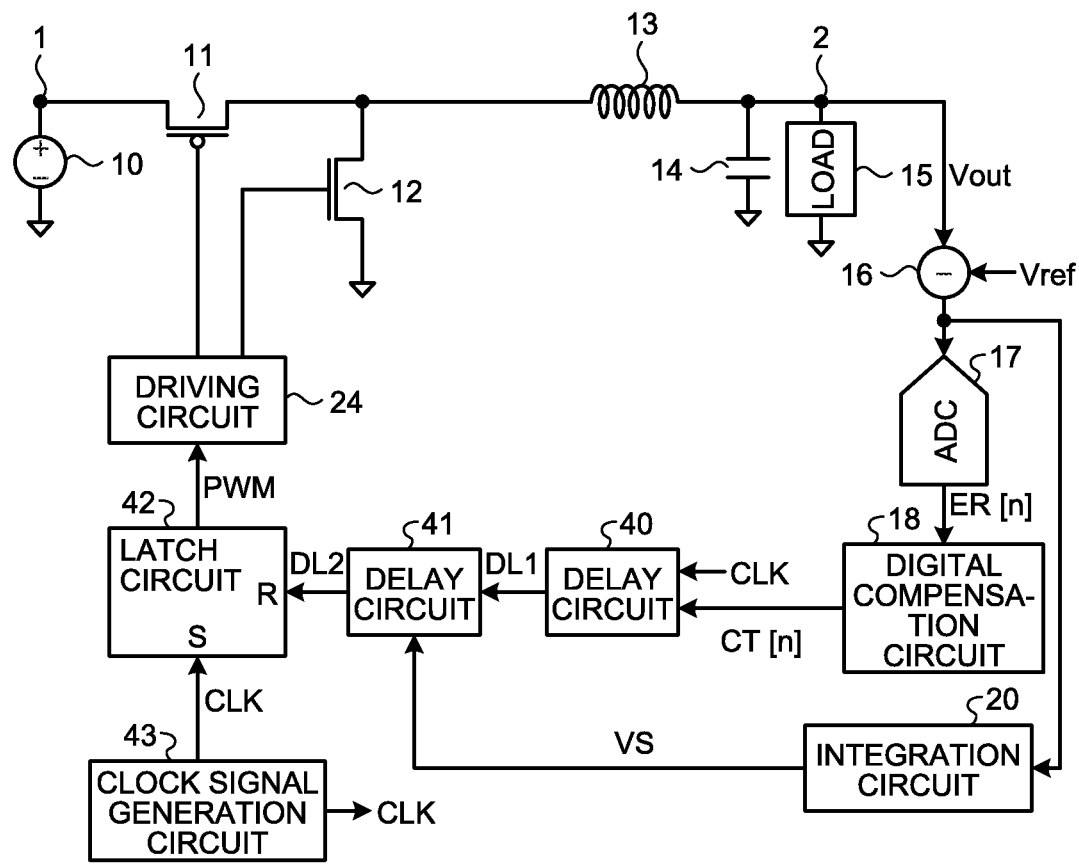
FIG. 5 is a diagram illustrating a power source circuit according to a fourth embodiment.

FIG. 5 is a diagram illustrating a power source circuit according to a fourth embodiment. The present embodiment includes a delay circuit 40 where a control value CT[n] of a digital compensation circuit 18 and a clock signal CLK are applied thereto. The delay circuit 40 outputs a delay signal DL1 provided by delaying a clock signal CLK depending on a control value CT[n] from the digital compensation circuit 18.

A delay signal DL1 is supplied to a delay circuit 41. The delay circuit 41 outputs a delay signal DL2 provided by delaying the delay signal DL1 depending on an integration signal VS from the integration circuit 20.

A delay signal DL2 of the delay circuit 41 is supplied to a reset terminal R of a latch circuit 42. A clock signal CLK of a clock signal generation circuit 43 is applied to a set terminal S of the latch circuit 42.

The latch circuit 42 outputs, and supplies to a driving circuit 24, a PWM signal PWM with a duty cycle that is controlled in response to a clock signal CLK from the clock signal generation circuit 43 and a delay signal DL2 from the delay circuit 41.

According to the present embodiment, a delay time of the delay circuit 40 is controlled depending on a control value CT[n] from the digital compensation circuit 18 and a delay time of the delay circuit 41 is controlled depending on an integration signal VS from an integration circuit 20. That is, a duration of a PWM signal PWM at a High level, that is, a duty cycle, is adjusted depending on a control path of digital control that includes an A/D converter 17 and an integration signal VS from a control path of analog control that includes the integration circuit 20. It is possible to provide a configuration to control a delay time of the delay circuit 40 rapidly by a control value CT[n] of the digital compensation circuit 18 of a digital control path that includes the A/D converter 17 and adjust a delay time of the delay circuit 41 finely and gradually by an integration signal VS of an analog control path that includes the integration circuit 20. Thereby, it is possible to control a duty cycle of a PWM signal PWM accurately and it is possible to control an output voltage Vout accurately.

Figure 6:
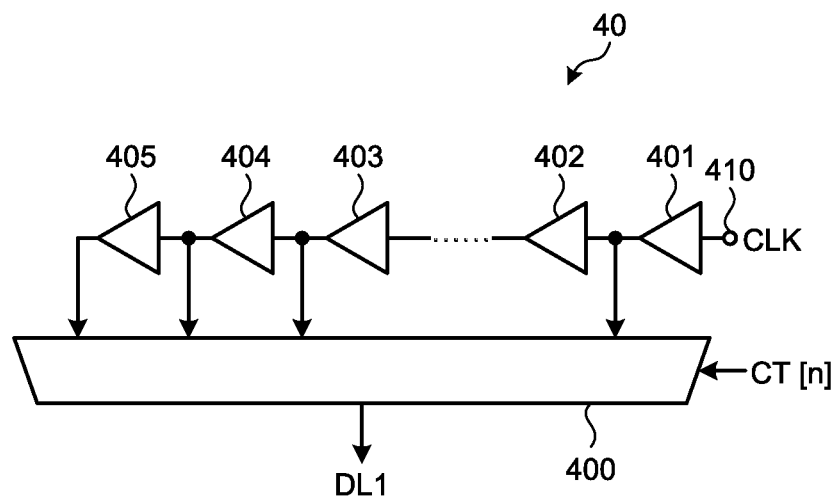
FIG. 6 is a diagram illustrating a configuration example of a delay circuit.

FIG. 6 is a diagram illustrating a configuration example of a delay circuit 40 according to the fourth embodiment as already described. The delay circuit 40 has buffer circuits 401 to 405 that are cascade-connected in a multistage manner. It is possible to provide each of the buffer circuits 401 to 405 that is composed of, for example, a Complementary MOS (CMOS) circuit. A clock signal CLK from a clock signal generation circuit 43 that is applied to an input terminal 410 is supplied to a buffer circuit 401 at a first stage.

An output signal of each of the buffer circuits 401 to 405 is supplied to a selector 400. The selector 400 selects one of signals of the buffer circuits 401 to 405 depending on a control value CT[n] from a digital compensation circuit 18 and outputs it as a delay signal DL1. The buffer circuits 401 to 405 have predetermined delay times. Therefore, output signals of the buffer circuits 401 to 405 are selected depending on a control value CT[n] and control of delay times dependent on a control value CT[n] is executed to output a delay signal DL1. A delay time of the delay circuit 40 is digitally controlled depending on a control value CT[n] from the digital compensation circuit 18, so that it is possible to control a delay time of the delay circuit 40 while an influence of noise is suppressed.

Figure 7:
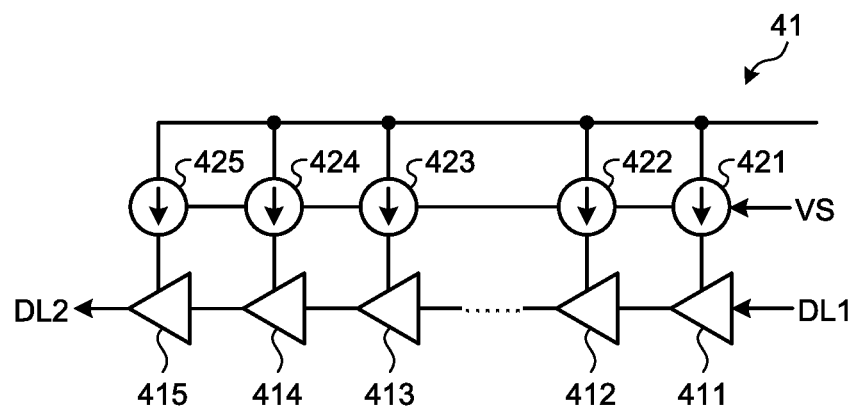
FIG. 7 is a diagram illustrating another configuration example of a delay circuit.

FIG. 7 is a diagram illustrating a configuration example of a delay circuit 41 according to the fourth embodiment as already described. The delay circuit 41 has buffer circuits 411 to 415 that are cascade-connected in a multistage manner. A delay signal DL1 from a delay circuit 40 is supplied to a buffer circuit 411 at a first stage.

Bias currents from current sources 421 to 425 are supplied to the buffer circuits 411 to 415, respectively. The current sources 421 to 425 are composed of, for example, a current mirror circuit. An integration signal VS is supplied to the current sources 421 to 425. Current values of the current sources 421 to 425 are controlled by an integration signal VS and delay times of the buffer circuits 411 to 415 are controlled.

For example, as current values of the current sources 421 to 425 are increased, operation speeds of the buffer circuits 411 to 415 are increased and delay times thereof are decreased. It is possible to provide a configuration to increase current values of the current sources 421 to 425 and decrease a delay time of the delay circuit 41 as an integration signal VS is elevated.

Additionally, a voltage dependent on an integration signal VS may be configured to be a bias voltage of each of the buffer circuits 411 to 415. For each of the buffer circuits 411 to 415, an operation speed is increased and a delay time is decreased, as a bias voltage is increased. Hence, it is possible to provide a delay circuit that is configured to decease a delay time as an integration signal VS is elevated.

Figure 8:
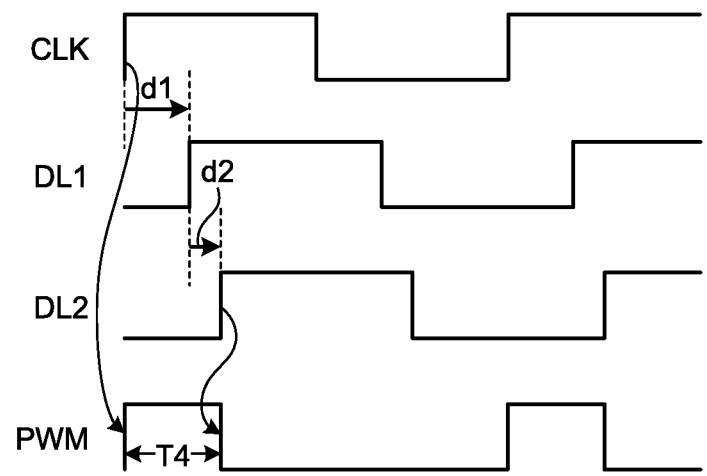
FIG. 8 is a diagram for explaining an operation of a power source circuit according to a fourth embodiment.

FIG. 8 is a diagram for explaining an operation of a power source circuit according to a fourth embodiment. As already described, a clock signal CLK is delayed by a delay time d1 by a delay circuit 40. A delay time d1 is controlled by a control value CT[n] of a digital compensation circuit 18. A delay signal DL1 is delayed by a delay time d2 by a delay circuit 41. A delay time d2 is controlled by an integration signal VS of an integration circuit 20.

A PWM signal PWM that is output by a latch circuit 42 is at a High level in response to a rise of a clock signal CLK or is at a Low level in response to a rise of a delay signal DL2 of the delay circuit 41. A delay time of a delay signal DL2 of the delay circuit 41 is controlled by a control value CT[n] from the digital compensation circuit 18 and an integration signal VS from the integration circuit 20, so that a duration T4 of a PWM signal PWM at a High level that is generated by a PWM signal PWM, therefore, a duty cycle, is controlled by a control value CT[n] from the digital compensation circuit 18 and an integration signal VS from the integration circuit 20.

That is, a clock signal CLK is delayed by a delay time d1 by the delay circuit 40 depending on a control value CT[n] from the digital compensation circuit 18 and a delay signal DL1 of the delay circuit 40 is delayed by a delay time d2 by the delay circuit 41 depending on an integration signal VS from the integration circuit 20. It is possible to execute control of a delay time of the delay circuit 40 by a control value CT[n] of the digital compensation circuit 18 of a digital control path that includes an A/D converter 17 and control of a delay time of the delay circuit 41 by an integration signal VS of an analog control path that includes the integration circuit 20.

Fifth Embodiment

Figure 9:
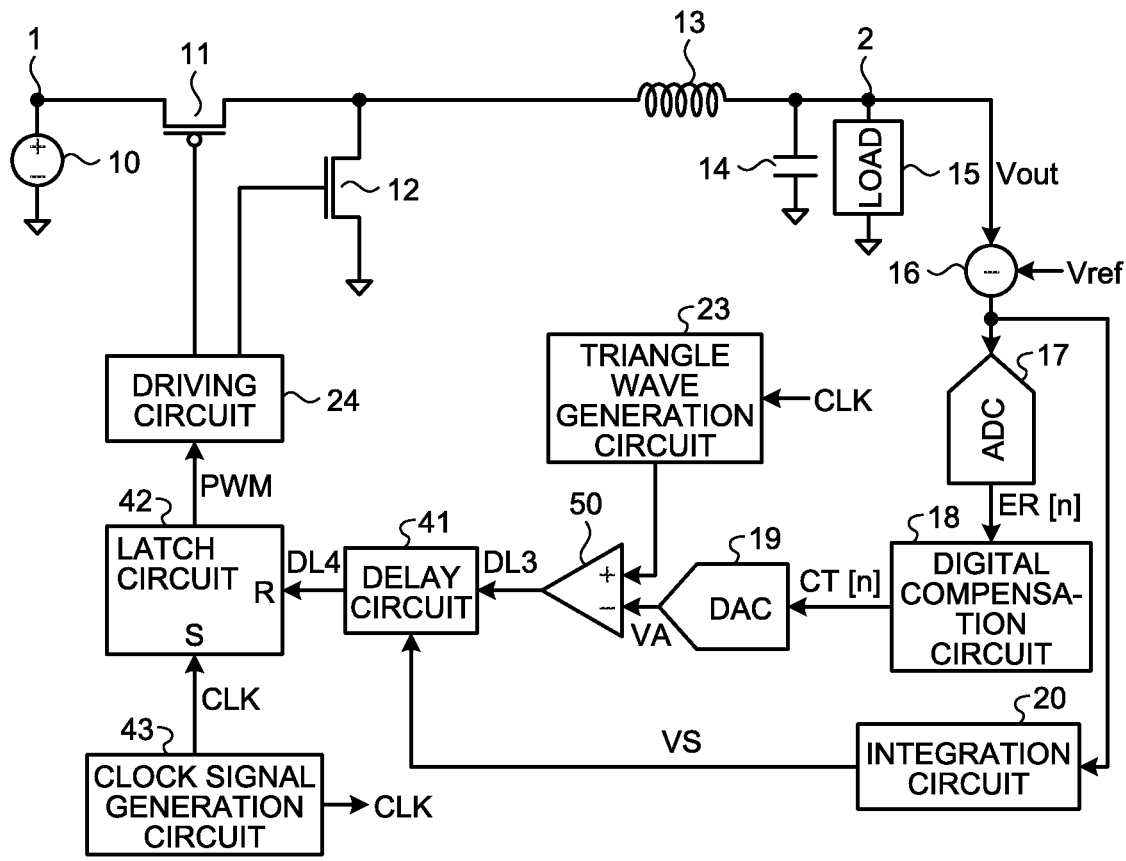
FIG. 9 is a diagram illustrating a power source circuit according to a fifth embodiment.

FIG. 9 is a diagram illustrating a power source circuit according to a fifth embodiment. The present embodiment has a comparison circuit 50 that compares an analog conversion signal VA of a D/A converter 19 and an output signal of a triangle wave generation circuit 23. The comparison circuit 50 outputs an output signal DL3 that is at a High level at a time when a voltage of a triangle wave from the triangle wave generation circuit 23 is higher than an analog conversion signal VA that is output by the D/A converter 19. The triangle wave generation circuit 23 generates and outputs a triangle wave in response to a clock signal CLK of a clock signal generation circuit 43.

An output signal DL3 that is output by the comparison circuit 50 is supplied to a delay circuit 41. The delay circuit 41 has, for example, a configuration similar to that of the delay circuit 41 according to the fourth embodiment as already described, and outputs, and supplies to a reset terminal R of a latch circuit 42, a delay signal DL4 provided by delaying an output signal DL3 of the comparison circuit 50 depending on an integration signal VS from an integration circuit 20.

The latch circuit 42 outputs, and supplies to a driving circuit 24, a PWM signal PWM with a duty cycle that is controlled in response to a clock signal CLK from the clock signal generation circuit 43 and a delay signal DL4 from the delay circuit 41.

According to the present embodiment, an output signal DL3 of the comparison circuit 50 that is generated by a digital control path that includes an A/D converter 17 is delayed by the delay circuit 41 with a delay time that is controlled depending on an integration signal VS from the integration circuit 20 and supplied to the latch circuit 42 that generates a PWM signal PWM. Timing when an output signal DL3 that is output by the comparison circuit 50 is at a High level is controlled depending on an analog conversion signal VA from the D/A converter 19 of a digital control path that includes the A/D converter 17. That is, a rise of an output signal DL3 that is output by the comparison circuit 50 is rapidly controlled depending on a control value CT[n] of a digital compensation circuit 18.

A delay time of the delay circuit 41 is controlled by the delay circuit 41 depending on an integration signal VS from the integration circuit 20 and output as a delay signal DL4. An integration signal VS from the integration circuit 20 is comparatively gradually changed. Hence, it is possible to provide a configuration to adjust a delay time of the delay circuit 41 finely and gradually by an integration signal VS of an analog control path that includes the integration circuit 20. Thereby, it is possible to control a duty cycle of a PWM signal PMW accurately, so that it is possible to control an output voltage Vout accurately.

Figure 10:
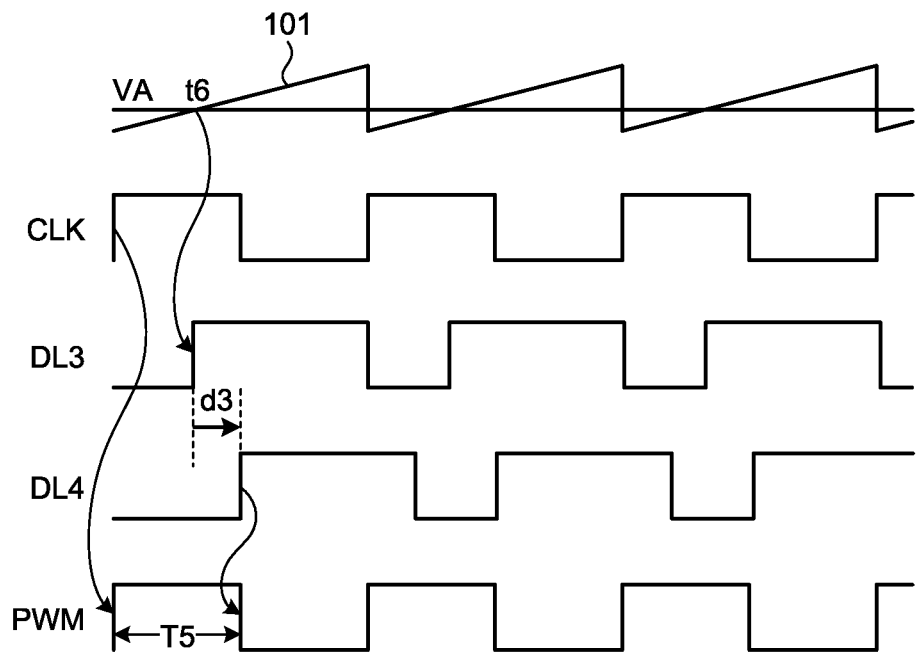
FIG. 10 is a diagram for explaining an operation of a power source circuit according to a fifth embodiment.

FIG. 10 is a diagram for explaining an operation of a power source circuit according to a fifth embodiment. In an uppermost section, a triangle wave 101 that is output by a triangle wave generation circuit 23 and an analog conversion signal VA that is output by a D/A converter 19 are illustrated. At timing t6 when a triangle wave 101 is greater than an analog conversion signal VA, a comparison circuit 50 outputs a signal at a High level as an output signal DL3. An output signal DL3 is delayed by a delay time d3 by a delay circuit 41 and the delay circuit 41 outputs a delay signal DL4. Timing t6 when an output signal DL3 is at a High level is delayed as an analog conversion signal VA from the D/A converter 19 is elevated, or is accelerated as an analog conversion signal VA is reduced.

Timing when an output signal DL3 of the comparison circuit 50 is at a High level is controlled by a control value CT[n] from a digital compensation circuit 18 and a delay time of the delay circuit 41 is controlled by an integration signal VS from an integration circuit 20, so that a duty cycle of a PWM signal PWM is controlled by two control paths that are a digital control path and an analog control path.

An output of a latch circuit 42 is at a High level in response to a rise of a clock signal CLK or is Low in response to a rise of a delay signal DL4. That is, the latch circuit 42 outputs, and supplies to a driving circuit 24, a PWM signal PWM with a duration of T5 at a High level.

Control of a duty cycle of a PWM signal PWM based on a control value CT[n] on a digital control path that includes an A/D converter 17, the digital compensation circuit 18, and the D/A converter 19 and control of a duty cycle of a PWM signal PWM based on an integration signal VS of an analog control path that includes the integration circuit 20 coexist, so that it is possible to provide a power source circuit configured to reduce a resolution of the A/D converter 17 that composes a digital control path. Thereby, it is possible to suppress power consumption. Furthermore, a digital control path coexists, so that it is possible to execute rapid control against a variation of an output voltage Vout.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power source circuit, comprising:
 a switching element with a main current path that is connected between an input terminal where an input voltage is applied thereto and an output terminal that supplies an output voltage thereto where turning on/off thereof is controlled by a PWM driving signal;
 a driving circuit that supplies the PWM driving signal to the switching element;
 a first control path that includes an integration circuit that outputs an integration signal provided by integrating a differential voltage between the output voltage and a reference voltage, and generates a first control signal;
 a second control path that includes an A/D converter that converts the differential voltage between the output voltage and the reference voltage into a digital signal, and generates a second control signal; and
 a PWM signal generation circuit that generates, and supplies to the driving circuit, a PWM signal with a pulse width that is adjusted depending on the first control signal and the second control signal,
 wherein the integration circuit includes:
 a voltage/current converter that outputs an output current dependent on the differential voltage between the output voltage and the reference voltage; and
 a capacitor that is charged with the output current of the voltage/current converter.

2. The power source circuit according to claim 1, wherein the second control path includes a digital compensation circuit that executes a predetermined operation process for an output signal of the A/D converter to output an output signal.

3. The power source circuit according to claim 2, wherein:
 the second control path includes a D/A converter that converts the output signal of the digital compensation circuit into an analog output signal; and
 the PWM signal generation circuit includes a comparison circuit that compares an addition signal provided by adding the analog output signal of the D/A converter and the first control signal and a predetermined triangle wave and generates the PWM signal depending on a result of such comparison.

4. The power source circuit according to claim 2, comprising:
 a first delay circuit that outputs a first delay signal with a delay time that is adjusted by the output signal of the digital compensation circuit;
 a second delay circuit that adjusts the delay time of the first delay signal of the first delay circuit depending on the first control signal, wherein the PWM signal generation circuit generates the PWM signal in response to an output signal of the second delay circuit.

5. The power source circuit according to claim 2, comprising:
a D/A converter that converts the output signal of the digital compensation circuit into an analog output signal;
a comparison circuit that compares the analog output signal of the D/A converter and a predetermined triangle wave; and
a delay circuit that delays an output signal of the comparison circuit depending on the first control signal and outputs a delayed output signal, wherein
the PWM signal generation circuit generates the PWM signal in response to the delayed output signal of the delay circuit.

6. The power source circuit according to claim 4, wherein:
the first delay circuit includes:
a plurality of cascade-connected buffer circuits; and
a selection circuit that selects and outputs an output signal of one buffer circuit among the plurality of buffer circuits depending on the output signal of the digital compensation circuit, and
the second delay circuit includes
a plurality of cascade-connected buffer circuits where a bias dependent on the second control signal is applied thereto.

7. The power source circuit according to claim 4, wherein the PWM signal generation circuit includes a latch circuit that responds to an output of the second delay circuit and a predetermined clock signal.

8. A power source circuit, comprising:
a switching element with a main current path that is connected between an input terminal where an input voltage is applied thereto and an output terminal that supplies an output voltage thereto where turning on/off thereof is controlled by a PWM driving signal;
a driving circuit that supplies the PWM driving signal to the switching element;
a first control path that includes an integration circuit that outputs an integration signal provided by integrating a differential voltage between the output voltage and a reference voltage, and outputs a first control signal;
a second control path that includes an A/D converter that converts the differential voltage between the output voltage and the reference voltage into a digital signal, and outputs a second control signal; and
a comparison circuit that compares an addition signal provided by adding the second control signal and the first control signal and a predetermined triangle wave and generates a PWM signal with a pulse width that is adjusted depending on a result of such comparison.

9. The power source circuit according to claim 8, wherein the second control path includes a digital compensation circuit that executes a predetermined operation process for an output signal of the A/D converter to output an output signal.

10. The power source circuit according to claim 8, wherein the integration circuit includes:
a voltage/current converter that outputs an output current dependent on the differential voltage between the output voltage and the reference voltage; and
a capacitor that is charged with the output current of the voltage/current converter.

11. The power source circuit according to claim 9, wherein the second control path includes a D/A converter that converts the output signal of the digital compensation circuit into an analog signal.

12. A power source circuit, comprising:
a switching element with a main current path that is connected between an input terminal where an input voltage is applied thereto and an output terminal that supplies an output voltage thereto where turning on/off thereof is controlled by a PWM driving signal;
a driving circuit that supplies the PWM driving signal to the switching element;
a first control path that includes an integration circuit that outputs an integration signal provided by integrating a differential voltage between the output voltage and a reference voltage, and outputs a first control signal;
a second control path that includes an A/D converter that converts the differential voltage between the output voltage and the reference voltage into a digital signal, and includes a delay circuit that outputs a delay signal with a delay time that is changed depending on an output of the A/D converter;
a first delay circuit that controls the delay time of the delay signal depending on the first control signal; and
a PWM signal generation circuit that generates, and supplies to the driving circuit, a PWM signal with a pulse width that is adjusted depending on an output signal of the first delay circuit and a predetermined clock signal,
wherein the integration circuit includes:
a voltage/current converter that outputs an output current dependent on the differential voltage between the output voltage and the reference voltage; and
a capacitor that is charged with the output current of the voltage/current converter.

13. The power source circuit according to claim 12, wherein the second control path includes a digital compensation circuit that executes a predetermined operation process for the output signal of the A/D converter to output an output signal.

14. The power source circuit according to claim 13, wherein the delay circuit is supplied with the predetermined clock signal and the output signal of the digital compensation circuit and controls a delay time of the predetermined clock signal depending on the output signal of the digital compensation circuit to output the delay signal.

15. The power source circuit according to claim 14, wherein the second control path includes:
a plurality of cascade-connected buffer circuits; and
a selection circuit that selects and outputs an output signal of one buffer circuit among the plurality of buffer circuits depending on the output signal of the digital compensation circuit.

16. The power source circuit according to claim 13, wherein the second control path includes:
a D/A converter that converts the output signal of the digital compensation circuit into an analog signal and outputs an analog output signal; and
a comparison circuit that compares the analog output signal of the DA converter with a predetermined triangle wave and outputs an output signal dependent on a result of such comparison.

17. The power source circuit according to claim 12, wherein the first delay circuit includes a plurality of cascade-connected buffer circuits, the delay signal is supplied to a cascade-connected buffer circuit at a first stage thereof, and a bias dependent on the first control signal is applied to the plurality of buffer circuits.

18. The power source circuit according to claim 12, wherein the PWM signal generation circuit includes a latch circuit that responds to the output signal of the first delay circuit and the predetermined clock signal.

* * * * *